S. W. Stockton,
Attaching Teeth to Plates.
No. 57,793.   Patented Sep. 4, 1866

Witnesses:

Inventor:

UNITED STATES PATENT OFFICE.

S. W. STOCKTON, OF PHILADELPHIA, PENNSYLVANIA.

IMPROVEMENT IN ATTACHING ARTIFICIAL TEETH TO BASES.

Specification forming part of Letters Patent No. 57,793, dated September 4, 1866.

*To all whom it may concern:*

Be it known that I, S. W. STOCKTON, of the city of Philadelphia, in the State of Pennsylvania, have invented a new and useful Improvement in the Mode of Attaching Artificial Teeth and Gums to the Base; and I do hereby declare that the following is a full, clear, and exact description of the same, reference being had to the accompanying drawings, making a part of this specification, in which—

Figure 5:
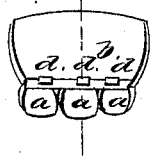
Figure 6:
Figure 7:
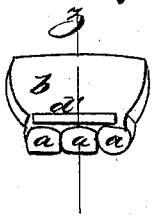

Figures 5 and 7 are, respectively, perspective views of a series of three teeth and the front or porcelain portion of their gums; and Fig. 6, a section in the dotted line $y$ of Fig. 5 and the dotted line $z$ of Fig. 7, like letters indicating the same parts when in the different figures.

The nature of my invention consists, substantially as hereinafter described and specified, in making tenons of either a dovetail, wedge, or conical form above the teeth, on the rear part of the porcelain portion of the gum attached to the same, so that when the said porcelain portion is being applied to the usual plastic base of gutta-percha or prepared caoutchouc the substance of the latter will be compelled to form corresponding counterparts to the said tenons of the former, which, when hardened, will afford reliable and permanent fastenings between the two said portions without the aid of the metal pins heretofore used for the same purpose.

In the drawings, $a\ a\ a$ are the teeth; $b$, the front portion of the gum, and $d\ d\ d\ d'$ the tenons thereof.

The teeth $a$ and the gum $b$, with the tenons $d$, are all formed of porcelain material by molding, and then heated and glazed in the usual manner, so as to constitute solid blocks of any number of teeth provided with tenons, substantially as represented in the drawings.

The tenons $d$, being larger at their outer ends, may be molded separately from the teeth and gum portion, and afterward stuck onto the latter while both are in a soft state; but I generally mold the said projections with their sides tapering, so as to draw easily out of the molds, and afterward undercut them, so as to make their outer ends larger than their inner ones, as seen in the drawings.

In some instances I make the tenons single or continuous in each block, as seen in Fig. 7. In other instances I make them in series or separated, as seen in Fig. 5.

In the operation of this mode of attaching the porcelain to the plastic base of artificial teeth it will be readily seen that it will be entirely efficient and durable as a fastening; that, whether the tenons be square, round, or triangular in their transverse sections, it will make but little difference in their effectiveness, provided always that the outer ends of the tenons be made larger than their inner ends.

What I claim as new, and desire to secure by Letters Patent, is—

Securing artificial teeth and gums to plastic bases by means of the tenons $d$, arranged along on the rear part of that portion of the porcelain blocks which projects inward just above the teeth, substantially as shown in the drawings and herein described.

S. W. STOCKTON.

Witnesses:
BENJ. MORISON,
B. F. SHATTUCK.